(12) United States Patent
Knoll et al.

(10) Patent No.: US 6,536,607 B1
(45) Date of Patent: Mar. 25, 2003

(54) TRANSPORTABLE RACK

(75) Inventors: Paul Knoll, Appleton, WI (US);
Michael W. Weiss, De Pere, WI (US);
Steve Jarosinski, Green Bay, WI (US);
Francis Steven Smidler, Lafayette, IN
(US); David Phillip Kunkel, Lebanon,
IN (US)

(73) Assignee: Schneider National Inc., Greenbay, WI (US)

( * ) Notice: Subject to any disclaimer, the term of this patent is extended or adjusted under 35 U.S.C. 154(b) by 0 days.

(21) Appl. No.: 09/999,573

(22) Filed: Nov. 15, 2001

(51) Int. Cl.[7] ............................................. A47G 19/08
(52) U.S. Cl. .................................................. 211/41.14
(58) Field of Search .......................... 211/41.14, 41.4, 211/198, 41.12, 41.13, 41.15, 49.1, 50

(56) References Cited

U.S. PATENT DOCUMENTS

| | | |
|---|---|---|
| 2,566,179 A | 8/1951 | Evans, Jr. et al. |
| 2,809,759 A | 10/1957 | Manker |
| 2,839,198 A | 6/1958 | Lefevre |
| 3,233,753 A | 2/1966 | Rich |
| 3,424,487 A | 1/1969 | Pector et al. |
| 3,596,755 A | 8/1971 | Bundy et al. |
| 3,878,942 A | 4/1975 | Hansen et al. |
| 3,955,676 A | 5/1976 | Hansen et al. |
| 4,014,435 A | 3/1977 | Rowley et al. |
| 4,037,870 A | 7/1977 | O'Neal |
| 4,092,815 A | 6/1978 | Rowley et al. |
| 4,093,251 A | 6/1978 | Boyer |
| 4,881,866 A | 11/1989 | Harmon |
| 5,114,288 A | 5/1992 | Langendorf et al. |
| 5,209,540 A | 5/1993 | Metler |
| 5,411,360 A | 5/1995 | Hilliker et al. |
| 5,711,429 A | 1/1998 | Brown |
| 5,755,339 A | 5/1998 | Belanger et al. |
| 5,860,539 A | 1/1999 | Brown |
| 6,102,206 A | 8/2000 | Pride |
| 6,135,701 A | 10/2000 | Galloway, Sr. |

*Primary Examiner*—Alvin Chin-Shue
*Assistant Examiner*—Sarah Porol
(74) *Attorney, Agent, or Firm*—Hunton & Williams (57) ABSTRACT

A transportable rack comprising a first A-frame upright attached to a first base member, a rolling device rotatably attached to the first base member, and a second A-frame upright attached to a second base member. The transportable rack further includes a central support member having a first end portion and a second end portion, the first end portion attached to the first base member, the second end portion attached to the second base member. In addition, a retractable beam member is slidably disposed within the central support member, the retractable beam member having a lift receiving device.

9 Claims, 11 Drawing Sheets

TRANSPORTABLE RACK

FIELD OF THE INVENTION

The present invention is directed to a transportable rack for hauling sheet material.

BACKGROUND OF THE INVENTION

In the glass hauling industry, there are many different types of glass racks and glass transportation methods. For example, the most common method of transporting large lites (sheets) of glass (96" tall by 130" long or larger) over the road has been on a flat bed trailers, in various glass racks that are removable or fixed to the trailer.

There are, however, several disadvantages associated with transporting glass sheets on a flat bed trailer. For example, the glass sheets must be loaded on the trailer by an overhead crane, which requires a large capital investment by the shipper and consignee. Another disadvantage is the manual load preparation process. Once loaded in place, the glass sheets must be padded, secured, and tarped to protect them from the elements. The loading process is also dangerous and difficult for the person performing the work. An additional disadvantage is that both the loading and unloading process are very time consuming, often causing disruption in the production flow of many glass manufactures.

Accordingly, there is a need for a transportable rack for hauling sheet materials that allows for rolling movement of the rack with the utilization of an adapter with a conventional forklift, and provides for easy transport within a covered vehicle.

BRIEF SUMMARY OF THE INVENTION

In accordance with one embodiment of the system and method of the invention, a transportable rack comprising a first A-frame upright attached to a first base member, a rolling device rotatably attached to the first base member, and a second A-frame upright attached to a second base member. The transportable rack further includes a central support member having a first end portion and a second end portion, the first end portion attached to the first base member, the second end portion attached to the second base member. In addition, a retractable beam member is slidably disposed within the central support member, the retractable beam member having a lift receiving device.

In yet another embodiment of the invention, a transportable rack is disclosed wherein the retractable member extends outwardly from within the central support member, the lift receiving device engaging a connector device attached to a lift device for lifting the retractable beam member, raising the second base member and allowing rolling movement of the transportable rack.

BRIEF DESCRIPTION OF THE DRAWINGS

The present invention can be more fully understood by reading the following detailed description of the presently preferred embodiments together with the accompanying drawings, in which like reference indicators are used to designate like elements, and in which.

DETAILED DESCRIPTION OF THE INVENTION

In accordance with one embodiment, the invention provides a transportable rack for hauling sheet material. A transportable rack comprising a first A-frame upright attached to a first base member, a rolling device rotatably attached to the first base member, and a second A-frame upright attached to a second base member is provided. The transportable rack further includes a central support member having a first end portion and a second end portion, the first end portion attached to the first base member, the second end portion attached to the second base member. In addition, a retractable beam member is slidably disposed within the central support member, the retractable beam member having a lift receiving device.

Further details of the systems and methods of the invention will hereinafter be described. As used herein, items referred to in the singular may also be in the plural, and items referred to in the plural may also be in the singular.

Figure 1:
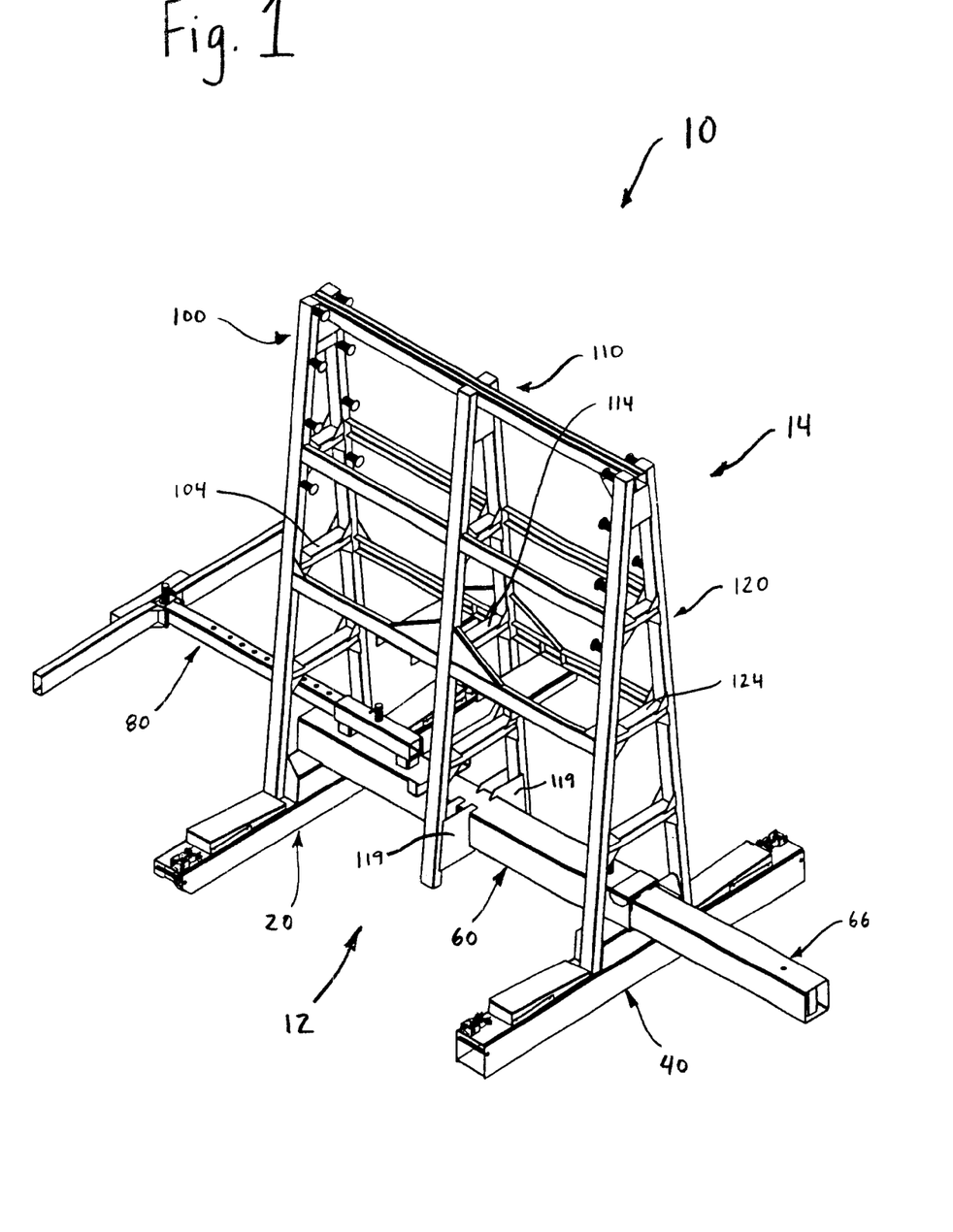
FIG. 1 is an isometric view of an illustrative transportable rack in accordance with one embodiment of the system and method of the invention.

FIG. 1 is an isometric view of an illustrative transportable rack in accordance with one embodiment of the method and system of the invention. Referring to FIG. 1, a transportable rack 10 is provided. For illustrative purposes, the transportable rack 10 is best described in two portions, i.e., a base portion 12 and an A-frame structure portion 14.

Figure 2:
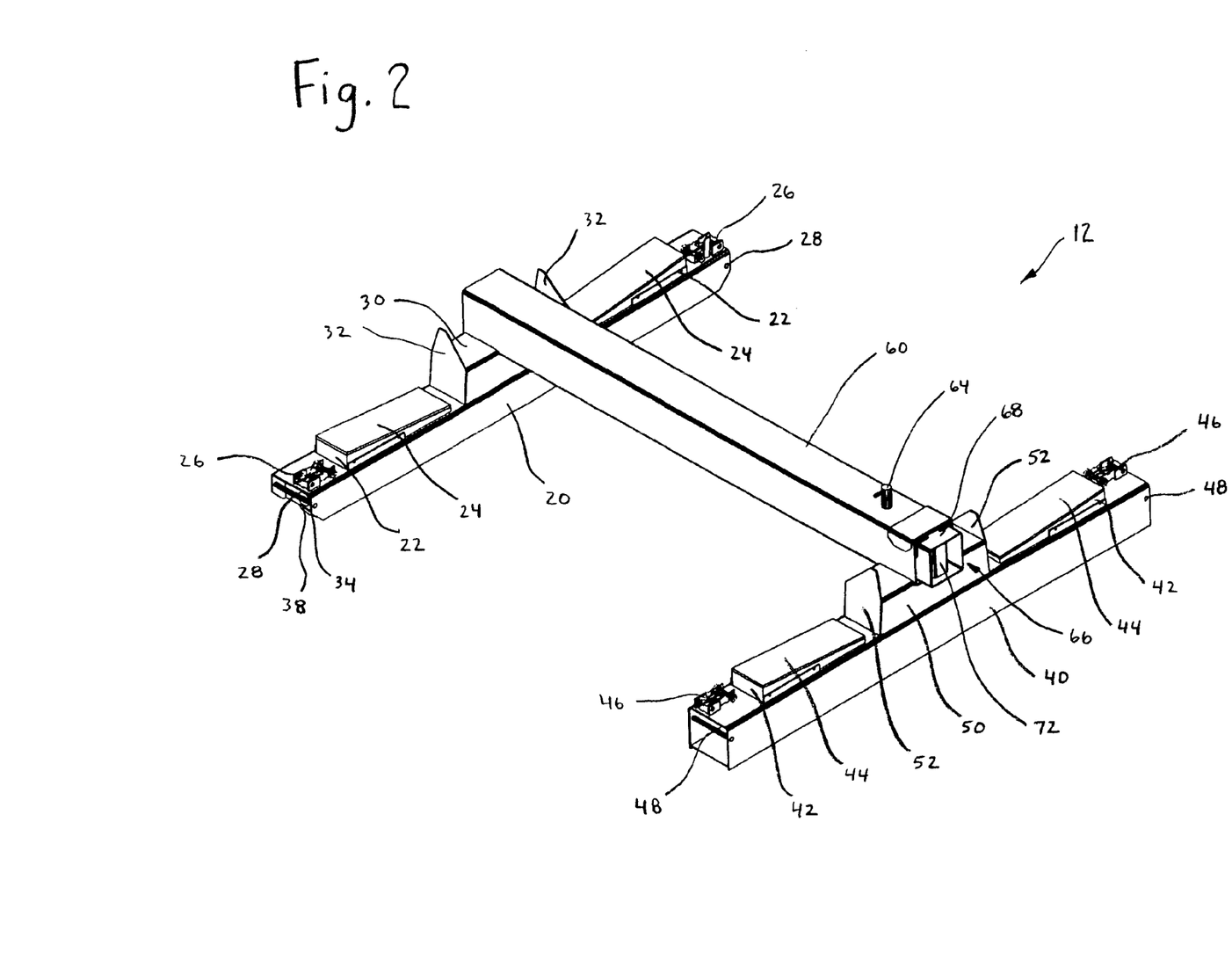
FIG. 2 is an isometric view of the base portion of the transportable rack of FIG. 1 in further detail in accordance with one embodiment of the system and method of the invention.

FIG. 2 is an isometric view of the base portion of the transportable rack of FIG. 1 in further detail in accordance with one embodiment of the system and method of the invention. As shown in FIG. 2, the base portion 12 is formed by first base member 20, second base member 40, and central support member 60. Central support member 60 connects first base member 20 and second base member 40 such that when viewed from above, in planar view, the base portion 12 appears I-shaped.

Central support member 60 has a first end portion 61 and second end portion 62, wherein the first end portion 61 is attached to first base member 20 and second end portion 62 is attached to second base member 40. Accordingly, central support member 60 is attached to and supported by first base member 20 and second base member 40.

A pair of setting blocks 22 are attached to the top of first base member 20 for resting sheet materials on when the transportable rack 10 is ready for use. Each setting block 22 includes a protective layer 24 on its top surface, such that when sheet materials are rested on the protective layer 24 covering setting block 22, the sheet material is not damaged, either during racking or transport. The protective layer 24 also helps hold the sheet materials in place and reduces sliding during transport or rolling movement of the transportable rack 10. On each outer end portion of the first base member 20, ratcheting buckles 26 are attached for receiving the straps that hold sheet materials on the transportable rack 10 during transport. A tie-off bar 28 is also mounted in each outer end portion of first base member 20 for securing the transportable rack 10 to the floor of van, or alternatively, a flatbed trailer.

First base member 20 also includes a center mount 30 and center mount plates 32 attached to the center mount 30. The center mount 30 and center mount plates 32 provide a base around which First A-frame upright 100 is positioned, and attached to the first base member 20.

Figure 3:
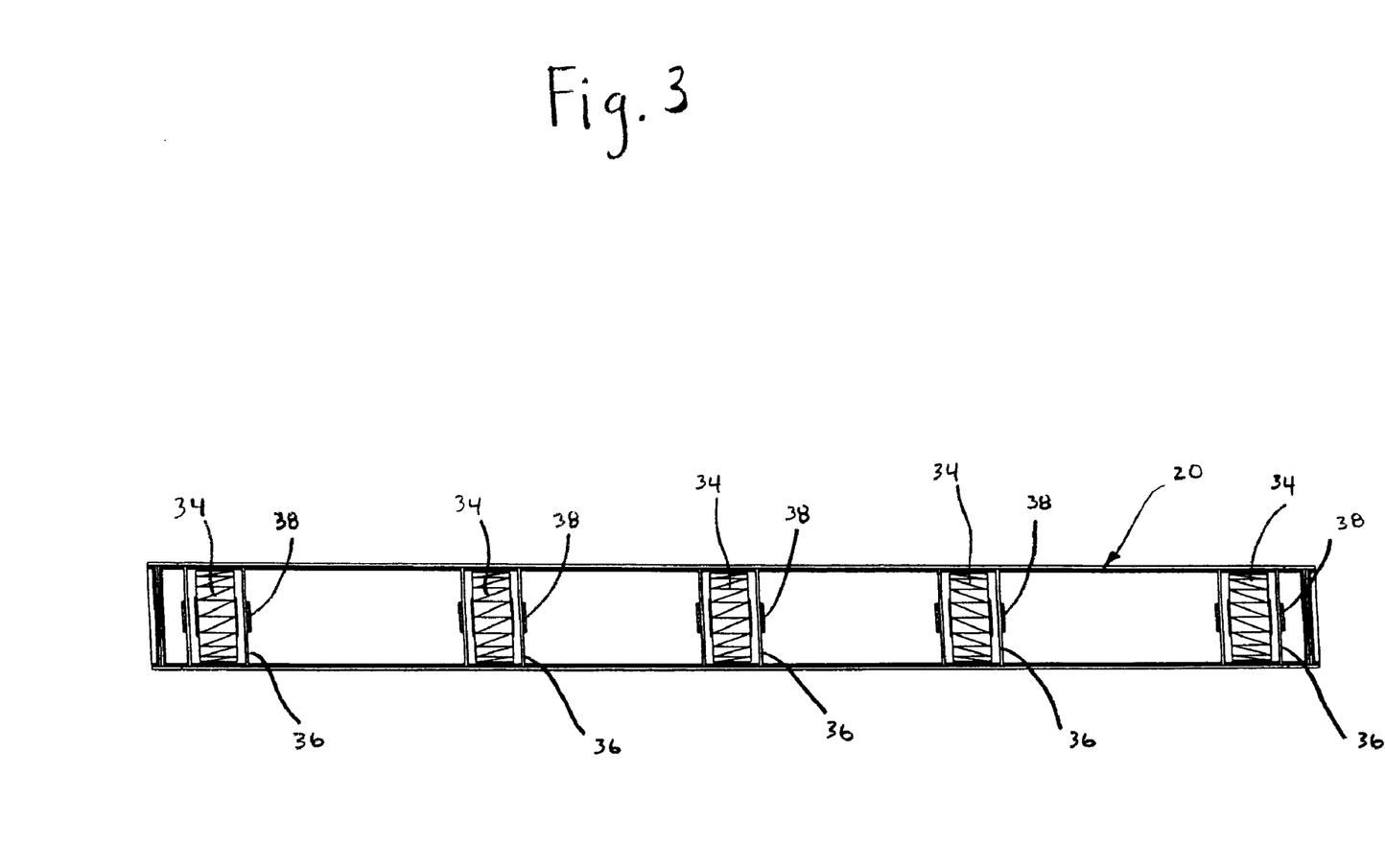
FIG. 3 is an underside view of the first base member of FIG. 2 in further detail in accordance with one embodiment of the system and method of the invention.

First base member 20 also has a plurality of wheels 34 rotatably attached. FIG. 3 is an underside view of the first base member of FIG. 2 in accordance with one embodiment of the system and method of the invention. As shown in FIG. 3, the plurality of wheels 34 are mounted in wheel wells 36 and secured by wheel pin assemblies 38. The wheels 34 provide a means for rolling movement of the transportable rack 10, i.e. a rolling device.

In this embodiment, five 4000 lb. capacity forged steel wheels comprise the plurality of wheels 34 may also have grease zerks and grease seals to provide for easy maintenance. Other types of wheels, or additional wheels may be added or substituted to adapt for varying load capacities in further embodiments. Moreover, it should be appreciated that other suitable devices may be installed within or attached to the first base member 20 to allow for rolling movement of the transportable rack 10, such as a single elongated wheel, tracks, or hydraulic-powered wheels that extend downwardly and raise the first base member from the ground surface, for example. These devices may easily be substituted in further embodiments, and may also be attached to the first base member 20 in any suitable manner, i.e. embedded within the base member, attached to its underside, hingedly attached to the outer surface of the base member, for example.

Returning to FIG. 2, second base member 40 is similar to first base member 20, except that in this embodiment, second base member 40 does not include a plurality of wheels. It should be noted, however, that further embodiments may utilize a rolling device on second base member 40 as well. Second base member 40 includes a pair of setting blocks 42 attached to the top of second base member 40 for resting sheet materials on when the transportable rack 10 is ready for use. Each setting block 42 includes a protective layer 44 on its top surface, such that when sheet materials are rested on the protective layer 44 covering setting block 42, the sheet material is not damaged, either during racking or transport. The protective layer 44 also helps hold the sheet materials in place and reduces sliding during transport or rolling movement of the transportable rack 10.

In the present embodiment, the settings blocks 22 and 42 are made of wood, making them easily replaceable when needed for wear and tear. However, setting blocks 22 and 42 can be made of any suitable material that is capable of supporting the sheet material load. The setting blocks 22 and 42 are also made with a small degree of taper such that the sheet materials rested thereon lean on the A-frame structure portion 14. A five degree taper provides a suitable angle of lean in the fragile sheet materials, such as glass, granite, stone product sheets, and other types of materials with low bending strenghts, to prevent damage and fracturing of the sheet materials. The five degree taper corresponds with the five degree taper of a conventional A-frame upright to form a right-angled seat for the sheet materials. Additionally, the protective layers 24 and 44, which are glued onto the top of each setting block 22 and 42 are made of rubber, or any form of cushioning material, to provide cushioning for the sheet materials rested on the setting blocks, as well as preventing sliding movement of the sheet materials. On each outer end portion of the second base member 40, ratcheting buckles 46 are attached for receiving the straps that hold sheet materials on the transportable rack 10 during transport. A tie-off bar 48 is also attached on each outer end portion of second base member 40 for securing the transportable rack 10 to the floor of van, or alternatively, a flatbed trailer. Second base member 40 may also include legs that contact a floor surface on which the transportable rack 10 sits to rest the rack upon and grip the fiber surface preventing movement when the rack is in a non-rolling position.

Second base member 40 also includes a center mount 50 and center mount plates 52 attached to the center mount 50. The center mount 50 and center mount plates 52 provide a base around which the second A-frame upright 120 is positioned, and attached to the second base member 40. It should be appreciated that first base member 20 and second base member 40 are formed steel channels in one embodiment of the invention. In yet another embodiment of the invention, the first base member 20 and second base member 40 may be formed steel tubes, in which the first base member 20 has a plurality of wheel well cavities for attaching a plurality of wheels.

As stated above, central support member 60 joins the first base member 20 and second base member 40. Of the central support member 60, first end 61 is attached to the center mount 30 of first base member 20, and second end 62 is attached to the center mount 50 of second base member 40, such that central support member 60 is attached to and supported by the two base members. When viewed from above, the base portion 12 appears I-shaped. In the present embodiment, central support member 60 is a elongate hollow beam, i.e. a formed steel tube, which acts as the outer housing for retractable beam member 66. In a non-operational position, retractable beam member 66, which is also a formed steel tube, is stored within the central support member 60.

Figure 4:
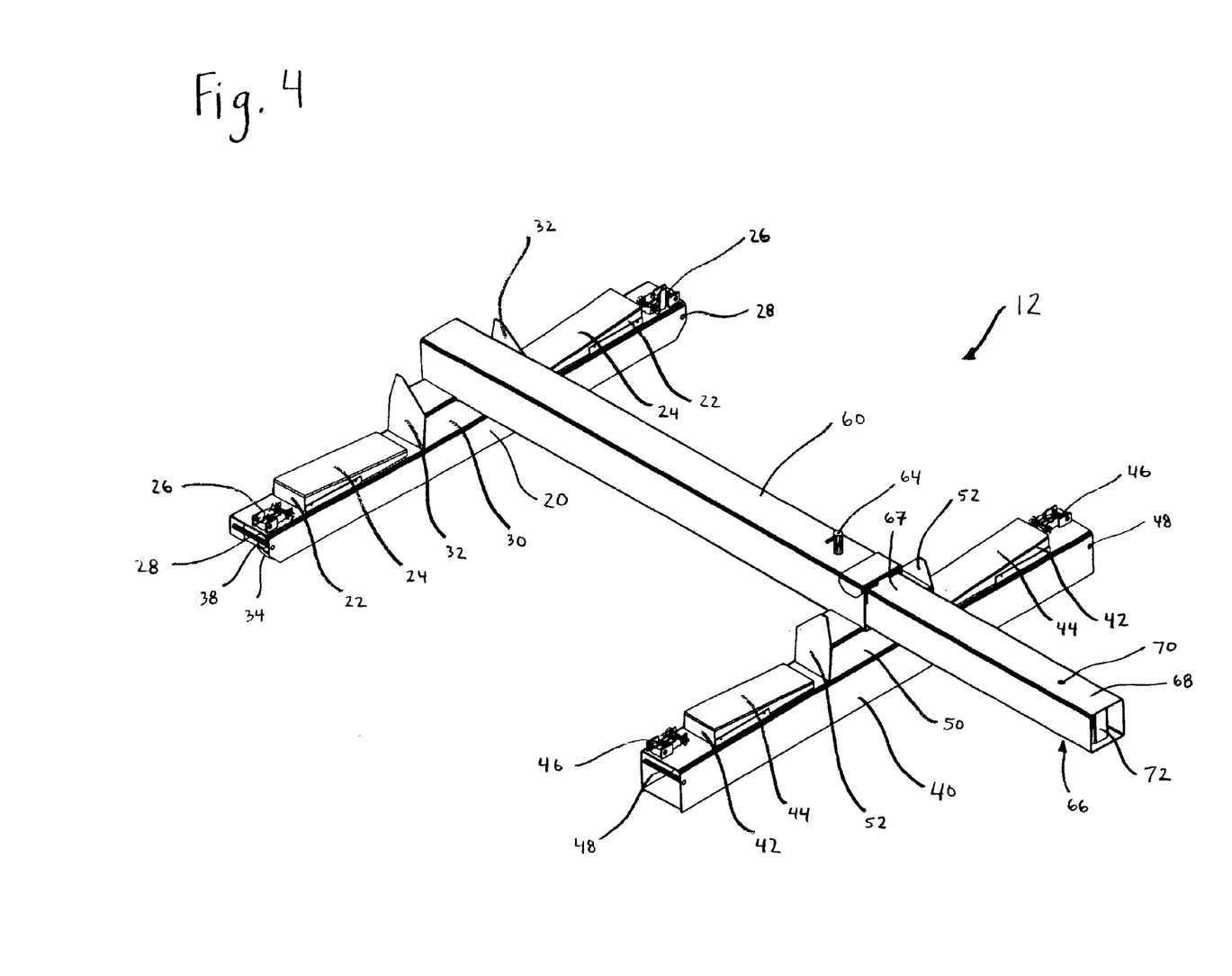
FIG. 4 is an isometric view of the base portion of FIG. 2 in further detail with the retractable beam member shown in an extended position in accordance with one embodiment of the system and method of the invention.

However, as shown in FIG. 4, the retractable beam member 66 slidably extends outwardly from the second end 62 of the central support member 60. FIG. 4 is an isometric view of the base portion of FIG. 2 with the retractable beam member shown in an extended position in accordance with one embodiment of the system and method of the invention. A tongue locking pin 64 secures the retractable beam member 66 in either an extended or retracted (i.e. stored) position. In the retracted position, as shown in FIG. 2, the retractable beam member 66 is held in place by the tongue locking pin 64 engaging the locking pin hole 70 in retractable beam member 66. A second locking pin hole in the inner portion 67 of retractable beam member 66 secures it in the extended position.

Retractable beam member 66 has an inner end portion 67 (within the central support member 60), and an outer end portion 68 which includes a lift receiving device 72. In the present embodiment, the lift receiving device 72 is a vertically arranged tube and welded into the retractable beam member 66, adapted to receive a standard ball-type hitch connection. Although in this embodiment of the invention the lift receiving device 72 is a square tube, in further embodiments of the invention, the tube may be different shapes, including cylindrical, for example.

Accordingly, a standard ball-type hitch engages the lift receiving device 72 allowing the raising of the outer end portion 68 of the retractable beam member 66, which is attached to the central support member 60 and second base member 40, and providing for the rolling movement of the transportable rack 10 on the wheels 34. It should be appreciated that in further embodiments of the invention, several different types of lift receiving devices may be utilized to allow a moving lift device to raise the retractable beam member and second base member, and roll the transportable rack. For example, a ball hitch could be attached to the retractable beam member, and a forklift adapter device could contain a socket connection for receiving the ball hitch. Additionally, the connection between the lift receiving device could employ a lock and pin connection, a latch connection, a coupling device, for example.

Additionally, in yet another embodiment of the invention, the transportable rack 10 further includes a device for preventing the endwise (longitudinal) movement of sheet materials placed on the transportable rack. As shown in FIG. 1, sheet stop assembly 80 is mounted on telescoping tube mounts 86 which are attached to central support member 60.

Figure 5:
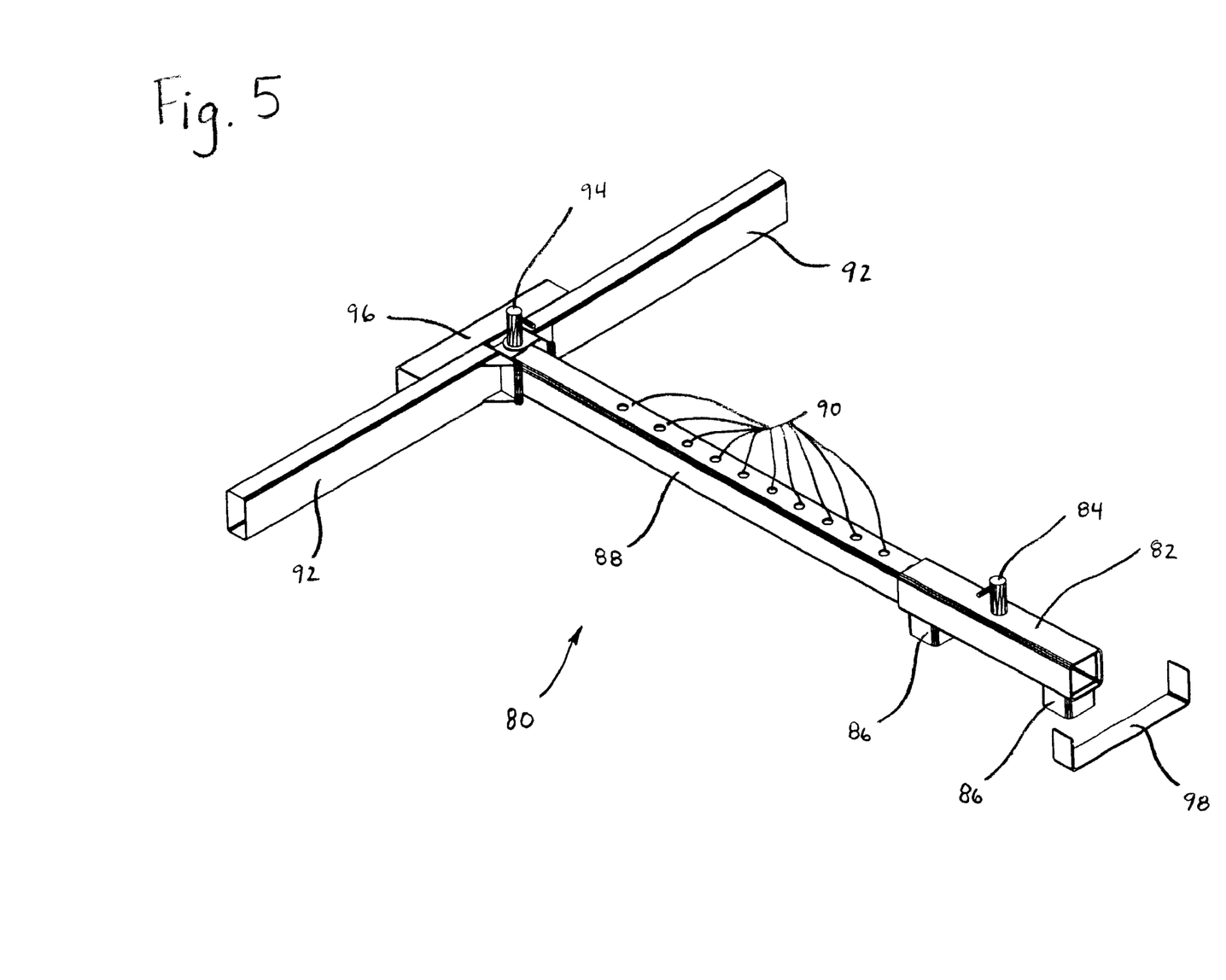
FIG. 5 is an isometric view of the sheet stop assembly of FIG. 1 in accordance with one embodiment of the system and method of the invention.

FIG. 5 is an isometric view of the sheet stop assembly of FIG. 1 in accordance with one embodiment of the system and method of the system and method of the invention. As shown in FIG. 5, sheet stop assembly 80 includes an outer telescoping tube 82, inner telescoping tube 88, telescoping locking pin 84, sheet stops 92, sheet stop locking pin 94, and front rack bumper 96. The outer telescoping tube 82 is a hollow elongate beam, i.e. a formed steel tube, mounted on telescoping tube mounts 86, which are attached to central support member 60. Inner telescoping tube 88 is also a hollow elongate beam, i.e. a formed steel tube, slidably housed in the outer telescoping tube 82. The inner telescoping tube 88 has a plurality of telescoping holes 90, integrally aligned, such that the telescoping locking pin 84, secured in locking pin hole 85 of outer telescoping tube 82, can lock the inner telescoping tube 88 in either an extended or retracted position with respect to the outer telescoping tube 82. The plurality of telescoping holes 90 is provided so that the sheet stop assembly 80 can account for sheet materials of varying sizes and lengths.

A pair of sheet stops 92 fold outwardly from the end of the inner telescoping tube 88 to prevent endwise movement of sheet materials placed on the transportable rack 10. The sheet stops 92 are secured to the end of the inner telescoping tube 88 by sheet stop locking pin 94, which allows the sheet stops 92 to pivot to and be secured in an extended position. Front rack bumper 96 is also attached to the end of inner telescoping tube 88 to protect the transportable rack 10 and any sheet materials that may be transported thereon, i.e. for when the transportable rack 10 is moved into a van or trailer for transport. A sheet stop cradle 98 is also provided, as shown in FIG. 1, for storing the sheet stops 92 in a stored position when the inner telescoping tube 88 is retracted within the outer telescoping tube 82 for moving the transportable rack 10 without carrying materials.

The transportable rack 10, as shown in FIG. 1, further includes an A-frame structure portion 14. In one embodiment, the A-frame structure portion 14 utilizes three A-frame uprights, first A-frame upright 100, middle A-frame upright 110, and second A-frame upright 120. First A-frame upright 100 has two vertically arranged legs 102, a plurality of lateral supports 104 secured to the legs 102, a plurality of corner braces 106, and a plurality of strap pegs 108 for securing transport straps thereto in combination with ratcheting buckles 26 on either end of first base member 20. First A-frame upright 100 is mounted on and attached to first base member 20. The base of each leg 102 is secured to center mount plates 32. In addition, second A-frame upright 120 also has two vertically arranged legs 122, a plurality of lateral supports 124 secured to the legs 122, a plurality of corner braces 126, and a plurality of strap pegs 128 for securing transport straps thereto in combination with ratcheting buckles 46 on either end of second base member 40. Second A-frame upright 120 is also mounted on and attached to second base member 40. The base of each leg 122 is secured to center mount plates 52.

It should be appreciated that the strap pegs 108 and 128 provide a point around which transport straps can be wrapped and thereafter ratcheted in the ratcheting buckles 24 and 46 for securing glass sheets on the transportation rack. In the present embodiment, sixteen strap pegs are utilized. Accordingly, a strap may be permanently secured to the second strap peg from the top of the first A-frame upright 100 and second A-frame upright 120 such that, depending on the sheet material size, the strap will be routed up over the top peg or down under one of the lower pegs. The straps are then secured over the sheets and tensioned and locked in the ratcheting buckles.

Middle A-frame upright 110 also has two vertically arranged legs 112, a plurality of lateral supports 114 secured to the legs 112 by a plurality of corner braces 116, and a pair of central support member braces 119. The pair of central support member braces 119 are attached to the base of each leg 112 such that the central support member braces 119 partially wrap around the central support member 40. Accordingly, the central support member braces 119 anchor on the central support member 40 to provide support for Middle A-frame upright 110.

As shown in FIG. 1, upper cross supports 130 act as the main longitudinal cross support for the A-frame structure portion 14. Although, in this embodiment, the upper cross supports 130 include two steel beams connecting the tops of the A-frame uprights, a single upper cross support may be utilized. A plurality of cross supports 134 connect first A-frame upright 100 to middle A-frame upright 110, and second A-frame upright 120 to middle A-frame upright 110. Cross supports 134 are also steel members. It should be appreciated that each part of the A-frame structure portion 14, including A-frame uprights and cross supports, may have a formed poly extrusion channel secured to their surfaces for attaching a padding or cushioning material to the exterior of the A-frame structure portion 14 that may contact the sheet materials. A suitable padding or cushioning material capable of attaching to the formed poly extrusion channel is called T-rubber, which has a large flange on its exterior side for contacting the sheet materials, and a small flange on the other side for attaching to the formed poly extrusion channel.

Figure 6:
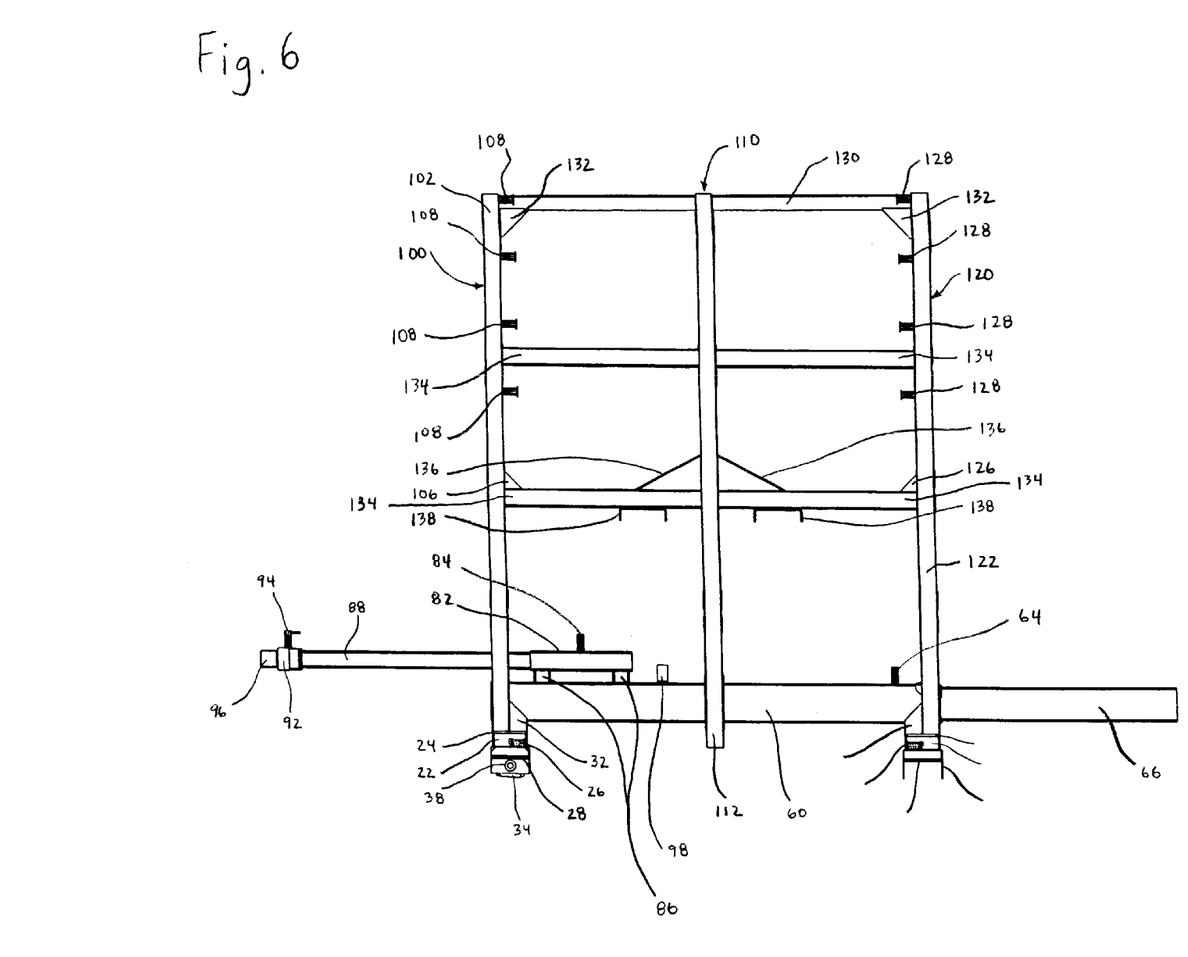
FIG. 6 is a side view of the transportable rack of FIG. 1 in accordance with one embodiment of the system and method of the invention.

To provide a better understanding of the A-frame structure portion 14, a side perspective of the transportable rack 10 is illustrated in FIG. 6. FIG. 6 is a side view of the transportable rack of FIG. 1 in accordance with one embodiment of the method and system of the invention. As illustrated in FIG. 6, the A-frame structure portion 14 further includes a lift cradle 138, comprising two inverted steel channels, for receiving the forks of a conventional fork lift. The lift cradle 138 is attached to the underside of one parallel group of cross supports 134. Accordingly, when the transportable rack 10 is to be placed in a stored position, a fork lift can lift the transportable rack 10 by the lift cradle 138 for fast movement. A set of angled braces 136 provide additional vertical support to the transportable rack 10, such that the angled braces 136 secure the cross supports 134, which have the lift cradle 138 attached thereto, to middle A-frame upright 110.

As seen in FIGS. 1–6, 8 and 10, in one embodiment of the invention, the transportable rack is constructed to allow for the raising of the outer end portion of the retractable beam member, which in turn causes the raising of the second base member, and allows for the rolling movement of the transportable rack. As illustrated in FIGS. 1–6, the retractable beam member 66 includes a lift receiving device 72 on its outer end portion 68. In this embodiment, the lift receiving device 72 is a square tube, vertically arranged and welded into the retractable beam member 66. Accordingly, a conventional forklift in combination with a forklift lift adapter device can be used to move the transportable rack 10. It should be appreciated that although many components of the disclosed transportable rack are made of steel, i.e. formed channels, tubes or beams, these members can be constructed of any suitable material capable of handling heavy load capacities. For example, if the present transportable rack is utilized to transport glass lites or sheet, it may carry more than 16,000 lbs. of glass on a single loading. This includes glass lites or sheets that may be 96"x144", or larger depending on the needs of the skilled artisan. Accordingly, other metal types, composites, or plastics suitable to handle such a load capacity may be substituted in place of the disclosed steel components.

Figure 7:
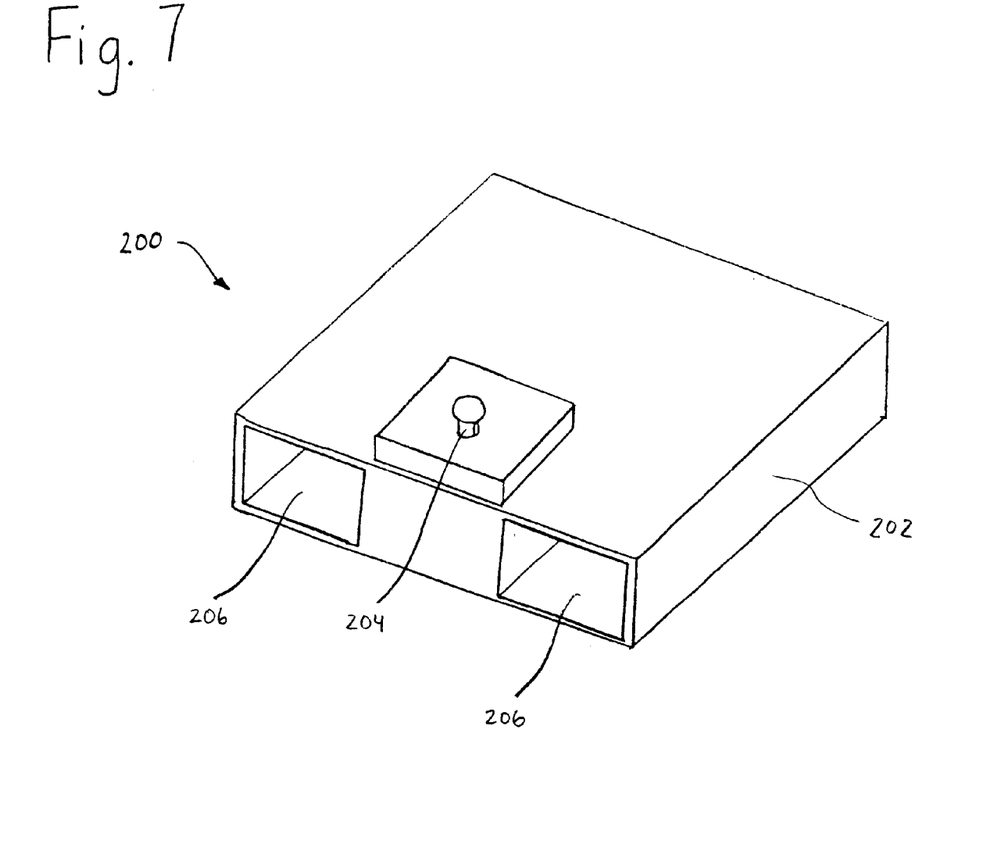
FIG. 7 is an illustrative forklift lift adapter device in accordance with one embodiment of the system and method of the invention.

FIG. 7 is an illustrative forklift lift adapter device in accordance with one embodiment of the system and method of the invention. Forklift lift adapter device 200 includes a base portion 202 having at least two channels 206 for receiving the forks of a conventional forklift. A hitch connection 204 is mounted on the base portion 202. The hitch connection 204 is a standard ball-type hitch that slips into the lift receiving device 72. Accordingly, the forklift adapter device 200 in combination with a conventional forklift allows for the raising and wheelbarrow-like movement of the transportable rack 10. This type of movement is also beneficial in that it allows for single articulation when backing the transportable rack 10 into a van or trailer.

It should be appreciated that the lift receiving device of the present invention allows for the rolling movement of the transportable rack with the use of a conventional forklift. As such, each delivery point for the transportable rack can move the transportable rack and the sheet materials with the use of a forklift lift adapter device on a forklift. It should be noted that most delivery points for glass sheets utilize a conventional forklift as a part of regular business, therefore, making the use of the present transportable rack efficient in that further capital investment is not necessary.

Figure 8:
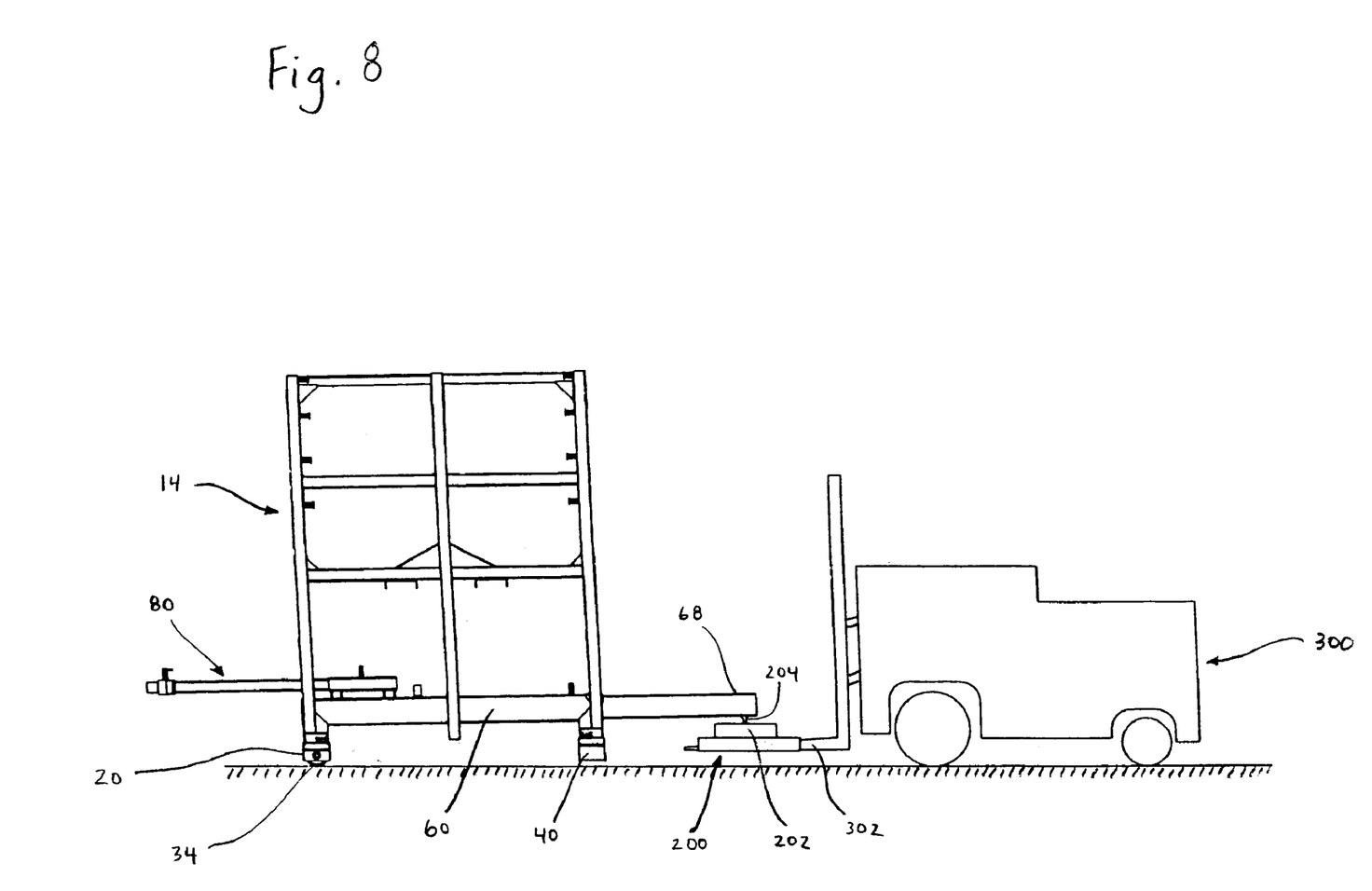
FIG. 8 is a side view of an illustrative transportable rack raised by a conventional forklift in combination with an illustrative forklift lift adapter device in accordance with one embodiment of the system and method of the invention.

FIG. 8 is a side view of an illustrative transportable rack raised by a conventional forklift in combination with an illustrative forklift lift adapter device in accordance with one embodiment of the system and method of the invention. As shown in FIG. 8, the forks 302 of conventional forklift 300 are inserted into channels 206 of forklift lift adapter device 200, and hitch connection 204 is engaging lift receiving device 72. Simply, the ball-type hitch is inserted in the hitch connection in the retractable beam member. The transportable rack of the present invention also provides additional methods of hauling sheet materials. It should be appreciated that although throughout the description of the various embodiments of the invention, the transportable rack may be used to transport sheet materials, such as glass lites, other types of materials may also be transported on the rack. These materials may include granite sheets, stone products, wood, plasterboard, pre-cast concrete, steel plates, and other sheet materials, especially those fragile materials with low bending strengths. Additionally, various commercial products with elongate shapes may also be transported on the transportable rack, including van trailer doors, building products, including building frames, for example.

Figure 9:
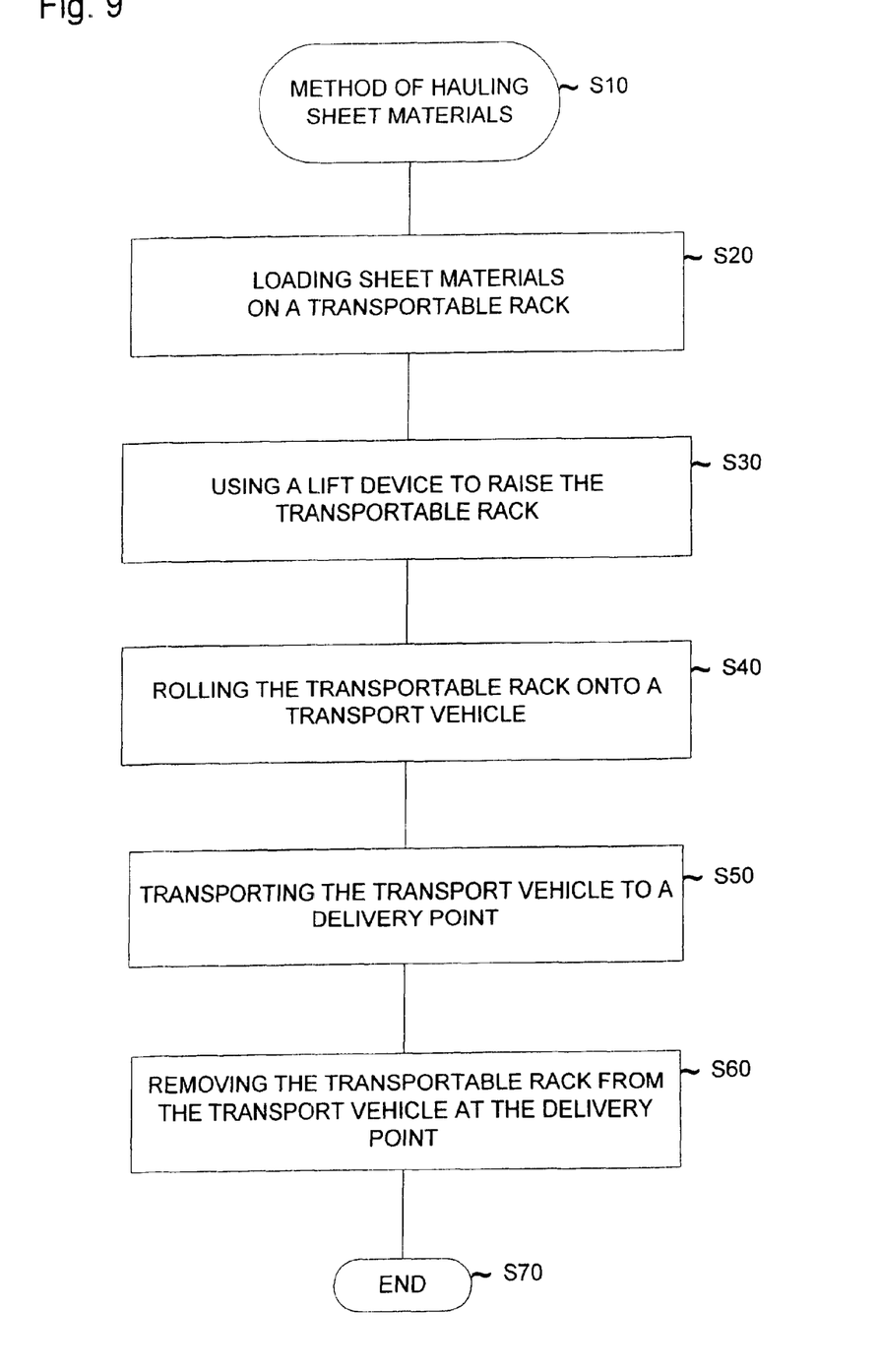
FIG. 9 is a flowchart illustrating a method of hauling sheet materials in accordance with one embodiment of the system and method of the invention.

FIG. 9 is a flowchart illustrating a method of hauling sheet materials in accordance with one embodiment of the system and method of the invention. The process being in step S10, and then passes to step S20.

Then, in step S20, sheet materials are loaded onto the transportable rack. The sheet materials are loaded onto the rack such that the sides of the sheet materials rest on the setting blocks of the disclosed transportable racks, and transport straps are used to secure the sheet materials on the transportable rack.

It should be appreciated that the moveable nature of the transportable rack of the present invention allows for the loading of the sheet materials on the rack at any suitable location, at any suitable time. Accordingly, glass lites can be loaded onto transportable racks at various locations at the glass manufacturer, including the area where the glass lite is cut and prepared for delivery, obviating the need to move the racks and store them until they are ready for loading. In addition, the ability to move the racks allows the glass manufacturer to pre-load the racks even before the transport vehicle arrives at the manufacturing plant to carry the racks and sheet materials to a delivery point. These advantages also translate to the facility accepting delivery of the racks, because that facility does not have to take the time to unload the glass lites from the rack as soon as they are delivered. The rack can be left at the delivery facility, and the glass lites can be stored on the rack until needed.

Returning to FIG. 9, in step S30, a lift device is utilized to raise the transportable rack. As described above, a lift device attached to a conventional forklift is inserted into the lift receiving device and then raised. The raising of the lift receiving device in turn raises a retractable beam member which in turn causes the second base member to be lifted from the floor surface. Therefore, the raising of the lift receiving device allows the transportable rack to be moved in a wheelbarrow type movement. Then, in step S40, the transportable rack is rolled onto a transport vehicle. It should be appreciated that the transport vehicle may be a van trailer, or flatbed trailer. Once secured in the transport vehicle, the transport vehicle with the transportable rack contained thereon is transported to a delivery point in step S50. The process then passes to step S60 wherein the transportable rack is removed from the transport vehicle at the delivery point. Thereafter, the process ends in step S70. This process allows for delivery of transportable racks to a delivery point wherein the transportable racks can be loaded at any point before or after a transport vehicle arrives at a loading point, and does not require the transport vehicle to remain at the delivery point until the sheet materials are unloaded from the transportable racks. This may, however, cause a build up of empty transportable racks at a given delivery point.

Accordingly, in one embodiment of the invention, the transportable rack can transform from having the retractable beam member and sheet stop assembly extended to a retracted position. In the retracted the position, the transportable rack can be arranged with other empty racks for storage and transport. In this respect, a method is disclosed wherein the transportable rack can be used to transport glass sheets, and once the glass sheets are delivered, the empty rack can remain at the delivery point. Once a delivery point accumulates a certain number of empty racks, the transportable racks of the present invention can be arranged and packed into a van trailer for return hauling to the glass manufacturer.

Figure 10:
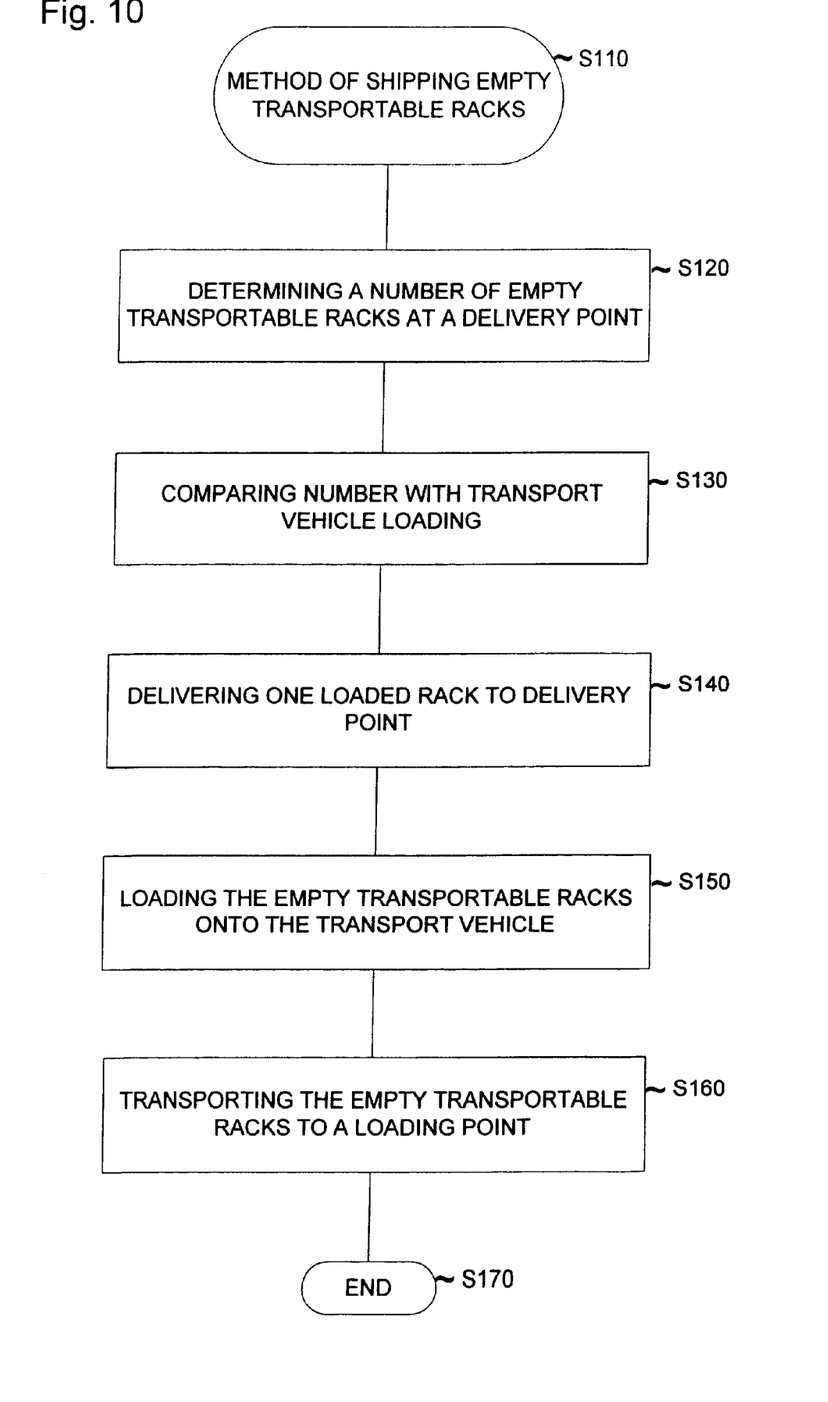
FIG. 10 is a flowchart illustrating a method of shipping empty transportable racks in accordance with one embodiment of the system and method of the invention.

FIG. 10 is a flowchart illustrating a method of shipping empty transportable racks in accordance with one embodiment of the system and method of the invention. The process begins in step S110 and passes to step S120 wherein a number of empty transportable racks at a delivery point is determined. This may be accomplished in any suitable fashion, including keeping records of the number of transportable racks delivered to a delivery point, monitoring the number of transportable racks at a given delivery point, or simply estimating a number of empty transportable racks at a delivery point based on a scheduled period.

Then, in step S130, the number of empty transportable racks at a delivery point is compared with a number of empty transportable racks associated with a transport vehicle loading. This comparison allows the shipper to determine when a shipping run of empty transportable racks is most efficient and cost effective, based on maintaining a full van or trailer on each leg of a transport journey. Once the number of empty transportable racks compares favorably with a transport vehicle loading, a loaded transportable rack with sheet materials is delivered to the delivery point in S140. Once the loaded transportable rack is removed from the transport vehicle at the delivery point, the empty transportable racks at the delivery point are loaded onto the transport vehicle in step S150. Then, in step S160, the empty transportable racks are transported back to a loading point. The process then ends in step S170. Utilizing this process, a shipper can maximize the number of empty racks maintained at a delivery point until it is most efficient to have the racks returned to the loading point. Therefore, in one embodiment of the invention, a plurality of empty transportable racks may be loaded into a conventional van trailer to maximize the shipping capacity of a transport vehicle.

Figure 11:
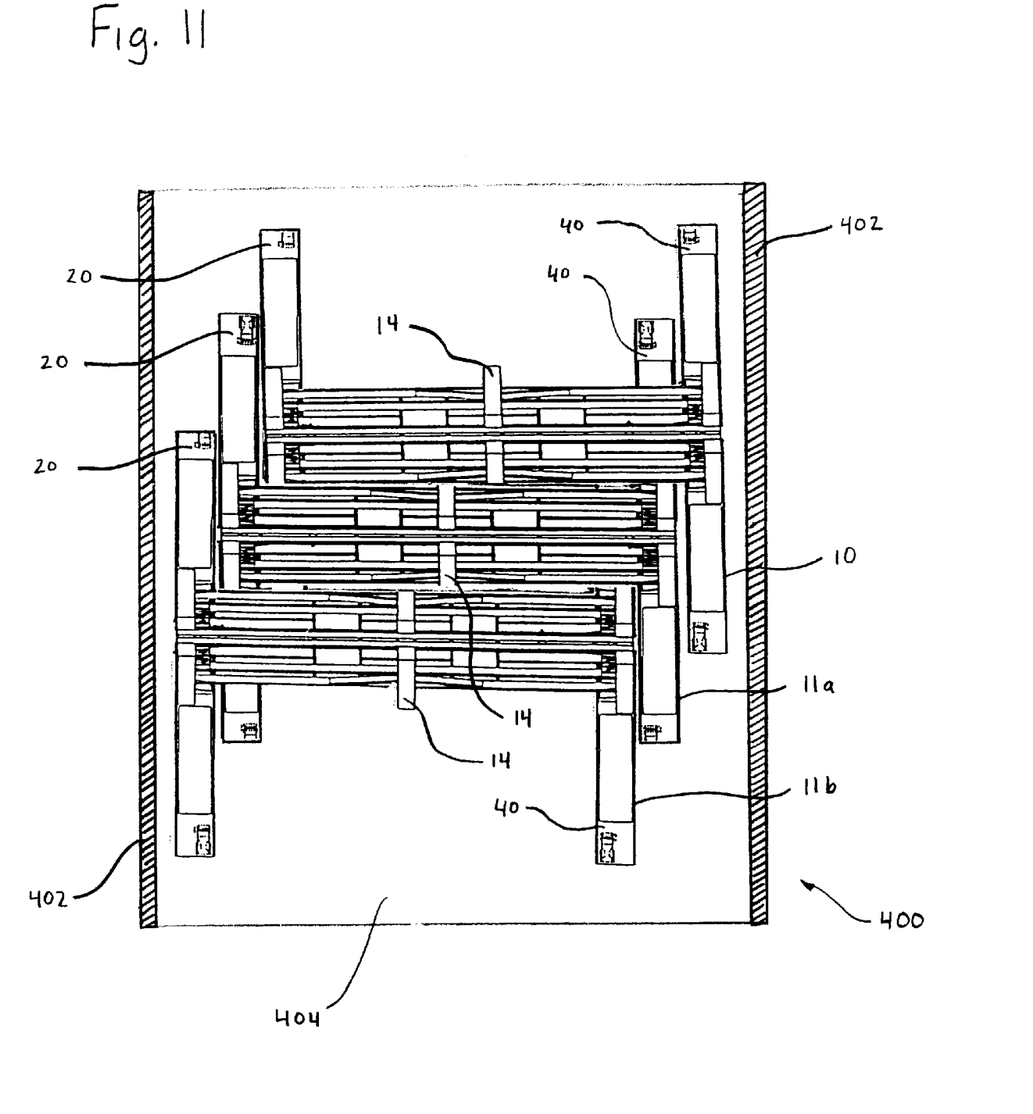
FIG. 11 is a planar view of an illustrative shipping arrangement of a plurality of empty transportable racks in accordance with one embodiment of the system and method of the invention.

FIG. 11 is a planar view of an illustrative shipping arrangement of a plurality of empty transportable racks in accordance with one embodiment of the system and method of the invention. The plurality of transportable racks, which includes transportable rack 10, transportable rack 11a, and transportable rack 11b, are prepared for empty shipping. In this embodiment of the invention, it should be appreciated that transportable racks 11a and 11b include each component included in transportable rack 10, as described above and hereinafter. Transportable racks 10, 11a and 11b are prepared for shipping by fully retracting the retractable beam member 66 within central support member 60, and also retracting the inner telescoping tube 88 within the outer telescoping tube 82 to a non-operational position wherein the sheet stops 92 are resting in the sheet stop cradle 98.

The transportable racks 10, 11a and 11b, when empty and prepared for shipping, are loaded onto a transport vehicle 400, side to side, such that the first base member 20 and second base member 40 face the side walls 402 of the transport vehicle 400. In this embodiment, the transport vehicle 400 is a van trailer. However, to provide further understanding of the nesting arrangement of the transportable racks 10, 11a and 11b, the roof of the transport vehicle 400 has been removed, exposing the interior shipping space 404 wherein the empty transportable racks are loaded and carried. The use of shipping space 404 is maximized when the transportable racks 10, 11a and 11b are nested together such that the first base member 20 and second base member 40 of the racks are side by side, and at least one of the base members slides underneath the A-frame structure portion of another transportable rack. As shown in FIG. 11, the second base member 40 of transportable rack 11 a is slid underneath the A-frame structure portion 14 of transportable rack 10. Similarly, the second base member 40 of transportable rack 11b is slid underneath the A-frame structure portion 14 of transportable rack 11a. Consequently, the first base member 20 of transportable rack 10 is slid underneath the A-frame structure portion 14 of transportable rack 11a, and the first base member 20 of transportable rack 11a is slid underneath the A-frame structure portion 14 of transportable rack 11b. Storing the empty transportable racks 10, 11a and 11b in this arrangement places the A-frame structure portions 14 of the different transportable racks side by side, and the empty transportable racks 10, 11a and 11b, can be stored in a nested relationship, side to side, in a conventional van trailer or high cube trailer. Therefore, utilizing this arrangement of the empty transportable racks 10, 11a and 11b, the use of shipping space 404 is maximized within the transport vehicle 400, making each transport run more cost efficient.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A transportable rack comprising:
   a first A-frame upright attached to a first base member;
   a rolling device rotatably attached to the first base member;
   a second A-frame upright attached to a second base member;
   a central support member having a first end portion and a second end portion, the first end portion attached to the first base member, the second end portion attached to the second base member;
   a retractable beam member slidably disposed within the central support member, the retractable beam member having a lift receiving device.

2. The transportable rack of claim 1 wherein the lift receiving device is a hitch connection connecting to a lift device of a moving vehicle.

3. The transportable rack of claim 1 wherein the retractable member extends outwardly from within the central support member, the lift receiving device engaging a connector device attached to a lift device for lifting the retractable beam member, raising the first base member and allowing rolling movement of the transportable rack.

4. The transportable rack of claim 3 wherein the lift receiving device is a hitch connection for a standard ball-type hitch.

5. The transportable rack of claim 1 wherein the rolling device is a plurality of wheels.

6. The transportable rack of claim 1 further including a sheet stop assembly attached to the central support member, the sheet stop assembly having an inner telescoping tube slidably disposed in an outer telescoping tube, the inner telescoping tube having at least one sheet stop foldably attached such that the sheet stop folds outwardly to prevent endwise movement of sheet materials on the transportable rack.

7. A method of hauling sheet materials comprising the steps of:

loading sheet materials on a transportable rack having a first A-frame upright attached to a first base member, a rolling device rotatably attached to the first base member, a second A-frame upright attached to a second base member, a central support member having a first end portion and a second end portion, the first end portion attached to the first base member, the second end portion attached to the second base member, a retractable beam member slidably disposed within the central support member, the retractable beam member having a lift receiving device;

utilizing a lift device to raise the lift receiving device of the retractable beam member, the raising of the lift receiving device lifting the second base member from a surface and allowing rolling movement of the transportable rack;

rolling the transportable rack on the rolling device onto a transport vehicle;

transporting the transport vehicle with the transportable rack to a delivery point; and removing the transportable rack from the transport vehicle at the delivery point.

8. A method of shipping empty transportable racks comprising the steps of:

determining a number of empty transportable racks at a delivery point;

comparing the number of empty transportable racks at the delivery point with a predetermined number of empty transportable racks loading a transport vehicle;

loading the number of empty transportable racks at the delivery point onto the transport vehicle; and transporting the number of empty transportable racks to a loading point.

9. The method of claim 8 further including the step of delivering at least one transportable rack with loaded sheet materials from a loading point to the delivery point.

* * * * *